(12) United States Patent
Quinn

(10) Patent No.: US 10,868,719 B2
(45) Date of Patent: Dec. 15, 2020

(54) SYSTEM AND METHOD FOR FEDERATED CONFIGURATION IN AN APPLICATION SERVER ENVIRONMENT

(71) Applicant: ORACLE INTERNATIONAL CORPORATION, Redwood Shores, CA (US)

(72) Inventor: Timothy Quinn, Lake Forest, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 171 days.

(21) Appl. No.: 15/945,055

(22) Filed: Apr. 4, 2018

(65) Prior Publication Data

US 2018/0316556 A1 Nov. 1, 2018

Related U.S. Application Data

(60) Provisional application No. 62/491,931, filed on Apr. 28, 2017.

(51) Int. Cl.
*H04L 12/24* (2006.01)

(52) U.S. Cl.
CPC ...... *H04L 41/0813* (2013.01); *H04L 41/0266* (2013.01)

(58) Field of Classification Search
CPC ..... H04L 43/10; H04L 12/24; H04L 41/0813; G06F 9/45558; G06F 11/3664; G06F 11/3051; G06F 11/3672; G06F 11/3055; G06F 8/65

See application file for complete search history.

(56) References Cited

U.S. PATENT DOCUMENTS

| | | | |
|---|---|---|---|
| 6,868,441 B2 | 3/2005 | Greene et al. |
| 6,922,685 B2 | 7/2005 | Greene et al. |
| 7,136,857 B2 | 11/2006 | Chen et al. |
| 7,150,015 B2 | 12/2006 | Pace et al. |
| 7,181,731 B2 | 2/2007 | Pace et al. |
| 7,188,003 B2 | 3/2007 | Ransom et al. |
| 7,200,657 B2 | 4/2007 | Adams et al. |
| 7,206,805 B1 | 4/2007 | McLaughlin, Jr. |
| 7,209,921 B2 | 4/2007 | Pace et al. |
| 7,290,056 B1 | 10/2007 | McLaughlin, Jr. |
| 7,392,255 B1 | 6/2008 | Sholtis et al. |
| 7,401,131 B2 | 7/2008 | Robertson et al. |
| 7,428,723 B2 | 9/2008 | Greene et al. |
| 7,430,610 B2 | 9/2008 | Pace et al. |
| 7,493,329 B2 | 2/2009 | McMullen et al. |

(Continued)

*Primary Examiner* — Sargon N Nano
(74) *Attorney, Agent, or Firm* — Tucker Ellis LLP

(57) ABSTRACT

In accordance with an embodiment, described herein is a system and method for providing federated configuration in an application server, enterprise computing, or other computing environment. A runtime domain configuration associated with a server can be derived from a base configuration, one or more configuration fragments, and one or more pluggable configuration transformers. Each configuration transformer can operate upon or revise a config descriptor's in-memory representation, for example by adding, deleting, or changing configuration elements within that representation. The changes made to an in-memory working runtime configuration can then be used to control the operating configuration and behavior of the server.

12 Claims, 8 Drawing Sheets

(56) References Cited

U.S. PATENT DOCUMENTS

| | | | |
|---|---|---|---|
| 7,590,687 B2 | 9/2009 | Bales et al. | |
| 7,680,927 B2 | 3/2010 | McMullen et al. | |
| 7,685,183 B2 | 3/2010 | Pace et al. | |
| 7,685,577 B2 | 3/2010 | Pace et al. | |
| 7,702,636 B1 | 4/2010 | Sholtis et al. | |
| 7,752,214 B2 | 7/2010 | Pizzomi et al. | |
| 7,761,910 B2 | 7/2010 | Ransom et al. | |
| 7,802,264 B2 | 9/2010 | Robertson et al. | |
| 7,822,781 B2 | 10/2010 | Greene et al. | |
| 7,856,486 B2 | 12/2010 | Robertson et al. | |
| 7,899,915 B2 | 3/2011 | Reisman | |
| 7,962,512 B1 | 6/2011 | Sholtis et al. | |
| 7,987,491 B2 | 7/2011 | Reisman | |
| 8,046,696 B2 | 10/2011 | Bales et al. | |
| 8,078,597 B2 | 12/2011 | Polk et al. | |
| 8,127,268 B2* | 2/2012 | Fernandez-Ivern | G06F 11/3664 717/101 |
| 8,161,172 B2 | 4/2012 | Reisman | |
| 8,185,643 B2 | 5/2012 | McMullen et al. | |
| 8,204,856 B2 | 6/2012 | Meyer et al. | |
| 8,255,818 B2 | 8/2012 | Bales et al. | |
| 8,326,883 B2 | 12/2012 | Pizzomi et al. | |
| 8,386,525 B2 | 2/2013 | Pace et al. | |
| 8,458,142 B2 | 6/2013 | Pace et al. | |
| 8,458,222 B2 | 6/2013 | Bobick et al. | |
| 8,468,244 B2 | 6/2013 | Redlich et al. | |
| 8,473,468 B2 | 6/2013 | Pace et al. | |
| 8,489,742 B2 | 7/2013 | Clubb et al. | |
| 8,527,545 B2 | 9/2013 | Bobick et al. | |
| 8,527,640 B2 | 9/2013 | Reisman | |
| 8,527,909 B1 | 9/2013 | Mullany | |
| 8,577,795 B2 | 11/2013 | Clubb et al. | |
| 8,626,877 B2 | 1/2014 | Greene et al. | |
| 8,631,456 B2 | 1/2014 | Reisman | |
| 8,640,183 B2 | 1/2014 | Reisman | |
| 8,645,248 B2 | 2/2014 | Roselli et al. | |
| 8,646,020 B2 | 2/2014 | Reisman | |
| 8,650,226 B2 | 2/2014 | Bobick et al. | |
| 8,661,495 B2 | 2/2014 | Reisman | |
| 8,666,933 B2 | 3/2014 | Pizzomi et al. | |
| 8,689,273 B2 | 4/2014 | Reisman | |
| 8,713,062 B2 | 4/2014 | Bobick et al. | |
| 8,774,029 B1* | 7/2014 | Mudalegundi | G06F 9/44505 370/252 |
| 8,813,125 B2 | 8/2014 | Reisman | |
| 8,843,386 B2 | 9/2014 | Greene et al. | |
| 8,850,507 B2 | 9/2014 | Reisman | |
| 8,856,087 B2 | 10/2014 | Greene et al. | |
| 8,875,215 B2 | 10/2014 | Reisman | |
| 8,893,212 B2 | 11/2014 | Reisman | |
| 8,898,722 B2 | 11/2014 | Reisman | |
| 8,914,840 B2 | 12/2014 | Reisman | |
| 8,918,506 B1 | 12/2014 | Clubb et al. | |
| 8,996,555 B2 | 3/2015 | Kuchmann-Beauger et al. | |
| 9,110,839 B2 | 8/2015 | Strzelczak et al. | |
| 9,135,629 B2 | 9/2015 | Simeonov | |
| 9,143,839 B2 | 9/2015 | Reisman | |
| 9,189,257 B2* | 11/2015 | Colyer | G06F 9/44505 |
| 9,282,145 B2* | 3/2016 | Wei | G06F 40/14 |
| 9,304,978 B2* | 4/2016 | Bezrukov | G06F 40/131 |
| 2002/0147611 A1 | 10/2002 | Greene et al. | |
| 2002/0165727 A1 | 11/2002 | Greene et al. | |
| 2002/0165745 A1 | 11/2002 | Greene et al. | |
| 2002/0169644 A1 | 11/2002 | Greene | |
| 2002/0173984 A1 | 11/2002 | Robertson et al. | |
| 2002/0174191 A1 | 11/2002 | Robertson et al. | |
| 2002/0178026 A1 | 11/2002 | Robertson et al. | |
| 2002/0188538 A1 | 12/2002 | Robertson et al. | |
| 2002/0198734 A1 | 12/2002 | Greene et al. | |
| 2003/0004744 A1 | 1/2003 | Greene et al. | |
| 2003/0004774 A1 | 1/2003 | Greene et al. | |
| 2003/0037173 A1 | 2/2003 | Pace et al. | |
| 2003/0050932 A1 | 3/2003 | Pace et al. | |
| 2003/0051066 A1 | 3/2003 | Pace et al. | |
| 2003/0051236 A1 | 3/2003 | Pace et al. | |
| 2003/0074207 A1 | 4/2003 | Pace et al. | |
| 2003/0074360 A1 | 4/2003 | Chen et al. | |
| 2003/0078958 A1 | 4/2003 | Pace et al. | |
| 2003/0084134 A1 | 5/2003 | Pace et al. | |
| 2003/0101223 A1 | 5/2003 | Pace et al. | |
| 2003/0131084 A1 | 7/2003 | Pizzomi et al. | |
| 2003/0140111 A1 | 7/2003 | Pace et al. | |
| 2003/0154266 A1 | 8/2003 | Bobick et al. | |
| 2003/0172135 A1 | 9/2003 | Bobick et al. | |
| 2003/0229900 A1 | 12/2003 | Reisman | |
| 2004/0031058 A1 | 2/2004 | Reisman | |
| 2004/0064548 A1 | 4/2004 | Adams et al. | |
| 2004/0133622 A1 | 7/2004 | Clubb et al. | |
| 2004/0153407 A1 | 8/2004 | Clubb et al. | |
| 2004/0193329 A1 | 9/2004 | Ransom et al. | |
| 2005/0144437 A1 | 6/2005 | Ransom et al. | |
| 2005/0240621 A1 | 10/2005 | Robertson et al. | |
| 2006/0075001 A1* | 4/2006 | Canning | G06F 8/65 |
| 2006/0195816 A1 | 8/2006 | Grandcolas et al. | |
| 2007/0110213 A1 | 5/2007 | Bales et al. | |
| 2007/0110233 A1 | 5/2007 | Polk et al. | |
| 2007/0112574 A1 | 5/2007 | Greene | |
| 2007/0112781 A1 | 5/2007 | McMullen et al. | |
| 2007/0112798 A1 | 5/2007 | Polk et al. | |
| 2007/0112799 A1 | 5/2007 | Bales et al. | |
| 2007/0112835 A1 | 5/2007 | McMullen et al. | |
| 2007/0112849 A1 | 5/2007 | McMullen et al. | |
| 2007/0112856 A1 | 5/2007 | Schram et al. | |
| 2007/0112913 A1 | 5/2007 | Bales | |
| 2007/0113187 A1 | 5/2007 | McMullen et al. | |
| 2007/0113188 A1 | 5/2007 | Bales et al. | |
| 2007/0113194 A1 | 5/2007 | Bales et al. | |
| 2007/0113201 A1 | 5/2007 | Bales et al. | |
| 2007/0124460 A1 | 5/2007 | McMullen et al. | |
| 2007/0286076 A1 | 12/2007 | Roever et al. | |
| 2008/0256549 A1 | 10/2008 | Liu et al. | |
| 2009/0254572 A1 | 10/2009 | Redlich et al. | |
| 2009/0319672 A1 | 12/2009 | Reisman | |
| 2009/0320073 A1 | 12/2009 | Reisman | |
| 2010/0121817 A1 | 5/2010 | Meyer et al. | |
| 2010/0121839 A1 | 5/2010 | Meyer et al. | |
| 2010/0142446 A1 | 6/2010 | Schlicht et al. | |
| 2010/0174692 A1 | 7/2010 | Meyer et al. | |
| 2010/0250497 A1 | 9/2010 | Redlich et al. | |
| 2011/0016348 A1 | 1/2011 | Pace et al. | |
| 2011/0022681 A1 | 1/2011 | Simeonov | |
| 2011/0093500 A1 | 4/2011 | Meyer et al. | |
| 2011/0099256 A1 | 4/2011 | Pace et al. | |
| 2011/0137934 A1 | 6/2011 | Pizzomi et al. | |
| 2011/0137935 A1 | 6/2011 | Bobick et al. | |
| 2011/0137949 A1 | 6/2011 | Bobick et al. | |
| 2011/0137953 A1 | 6/2011 | Bobick et al. | |
| 2011/0213859 A1 | 9/2011 | Greene et al. | |
| 2011/0219419 A1 | 9/2011 | Reisman | |
| 2012/0005166 A1 | 1/2012 | Pace et al. | |
| 2012/0005205 A1 | 1/2012 | Bobick et al. | |
| 2012/0166623 A1* | 6/2012 | Suit | G06F 11/3006 709/224 |
| 2012/0167094 A1* | 6/2012 | Suit | G06F 9/5077 718/100 |
| 2012/0179677 A1 | 7/2012 | Roselli et al. | |
| 2012/0215560 A1 | 8/2012 | Ofek et al. | |
| 2012/0239612 A1 | 9/2012 | George et al. | |
| 2013/0036278 A1 | 2/2013 | Strzelczak et al. | |
| 2013/0054820 A1 | 2/2013 | Reisman | |
| 2013/0055315 A1 | 2/2013 | Reisman | |
| 2013/0061264 A1 | 3/2013 | Reisman | |
| 2013/0061273 A1 | 3/2013 | Reisman | |
| 2013/0067526 A1 | 3/2013 | Reisman | |
| 2013/0073738 A1 | 3/2013 | Reisman | |
| 2013/0074129 A1 | 3/2013 | Reisman | |
| 2013/0091252 A1 | 4/2013 | Pizzomi et al. | |
| 2014/0006951 A1 | 1/2014 | Hunter | |
| 2014/0123129 A1* | 5/2014 | Risbood | G06F 9/45558 717/176 |
| 2014/0123168 A1 | 5/2014 | Reisman | |
| 2014/0123184 A1 | 5/2014 | Reisman | |
| 2014/0123186 A1 | 5/2014 | Reisman | |

(56) References Cited

U.S. PATENT DOCUMENTS

| | | |
|---|---|---|
| 2014/0123187 A1 | 5/2014 | Reisman |
| 2014/0130105 A1 | 5/2014 | Reisman |
| 2014/0149446 A1 | 5/2014 | Kuchmann-Beauger et al. |
| 2014/0281918 A1* | 9/2014 | Wei .................. H04L 67/02 715/234 |
| 2014/0324835 A1 | 10/2014 | Schiller |
| 2015/0135206 A1 | 5/2015 | Reisman |
| 2015/0135214 A1 | 5/2015 | Reisman |
| 2015/0143395 A1 | 5/2015 | Reisman |
| 2016/0048408 A1 | 2/2016 | Madhu et al. |
| 2016/0088012 A1 | 3/2016 | Casey et al. |
| 2016/0094478 A1* | 3/2016 | Quinn ................ G06F 9/5077 709/226 |
| 2016/0112346 A1 | 4/2016 | Nahrgang et al. |
| 2016/0241565 A1 | 8/2016 | Greene et al. |
| 2016/0308982 A1 | 10/2016 | Greene |
| 2016/0380841 A1* | 12/2016 | Cordray ............... H04L 67/34 709/222 |
| 2017/0048215 A1 | 2/2017 | Straub |
| 2017/0048252 A1 | 2/2017 | Straub et al. |
| 2017/0161177 A1* | 6/2017 | Bird .................. G06F 11/3672 |
| 2017/0323089 A1 | 11/2017 | Duggal et al. |
| 2018/0205782 A1* | 7/2018 | Wei ................... H04L 67/2847 |
| 2019/0058632 A1* | 2/2019 | Schneider ............. H04L 43/10 |

* cited by examiner

SYSTEM AND METHOD FOR FEDERATED CONFIGURATION IN AN APPLICATION SERVER ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Application titled "SYSTEM AND METHOD FOR CONFIGURATION IN AN ENTERPRISE COMPUTING PLATFORM OR CLOUD ENVIRONMENT", Application No. 62/491,931, filed Apr. 28, 2017; which application is herein incorporated by reference.

FIELD OF INVENTION

Embodiments of the invention are generally related to systems and methods for providing federated configuration in an application server, enterprise computing, or other computing environment.

BACKGROUND

In an application server, enterprise computing, or other computing environment, changing a particular set of configuration information, for example the configuration of a domain, traditionally involves updating the configuration at an administration server, and then activating the changes, so that the administration server can coordinate updates to other running servers within the domain.

However, some computing environments, such as cloud environments, may utilize a network infrastructure that is not completely reliable, and the traditional model of performing updates to a domain configuration can lead to problems such as missed network messages, and late or inaccessible file updates. Additionally, if a domain comprises several software layer components, as might be provided in an enterprise computing environment, then various configuration changes from all of the layers may be blended together, for example in a config.xml file and its associated external descriptors, with no inherent way of determining from which particular layer a particular configuration setting may have originated, or otherwise tracing changes made to the domain configuration by those layer components.

SUMMARY

In accordance with an embodiment, described herein is a system and method for providing federated configuration in an application server, enterprise computing, or other computing environment. A runtime domain configuration associated with a server can be derived from a base configuration, one or more configuration fragments, and one or more pluggable configuration transformers. Each configuration transformer can operate upon or revise a config descriptor's in-memory representation, for example by adding, deleting, or changing configuration elements within that representation. The changes made to an in-memory working runtime configuration can then be used to control the operating configuration and behavior of the server.

DETAILED DESCRIPTION

Figure 1:
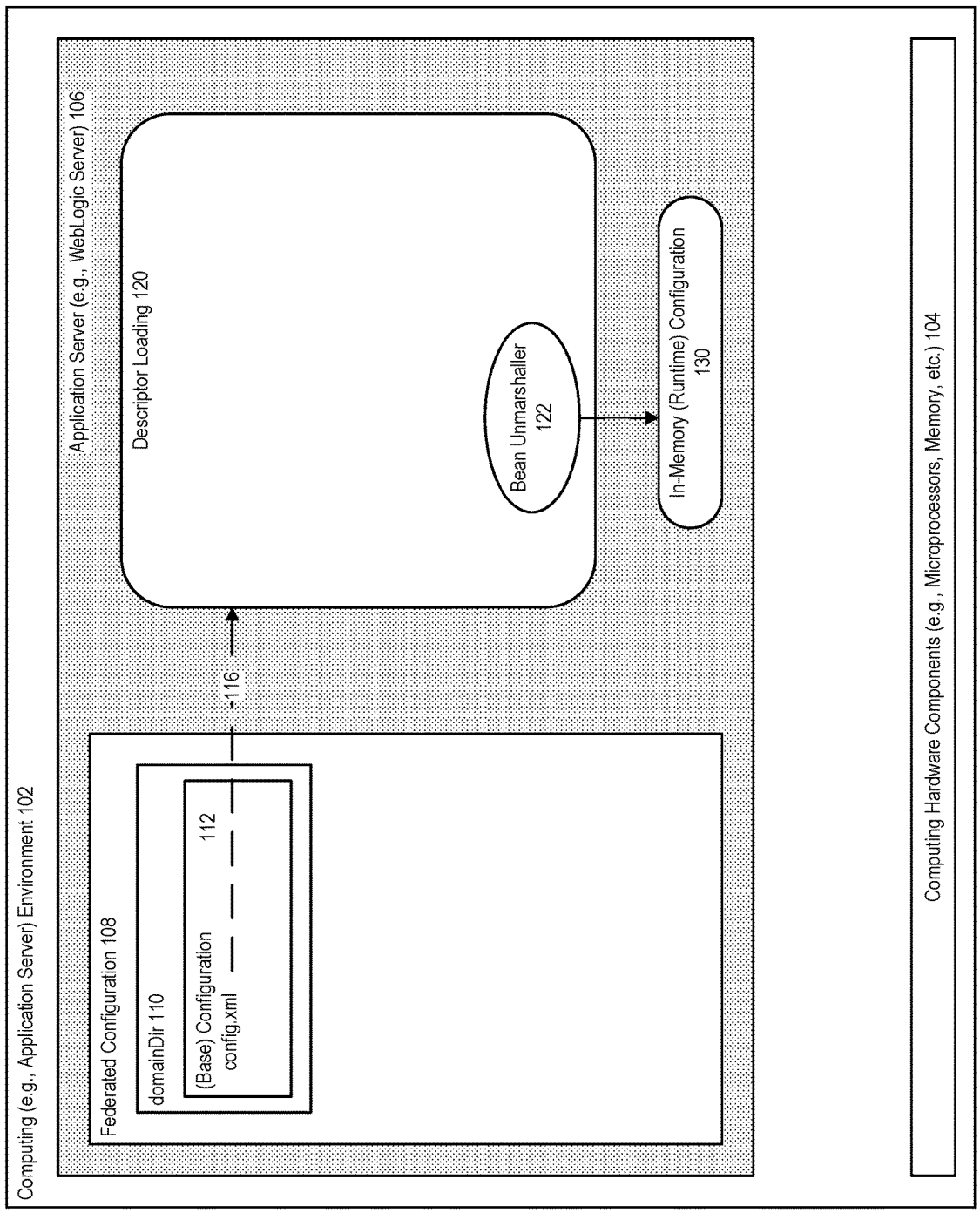
FIG. 1 illustrates a system for providing federated configuration in an application server, enterprise computing, or other computing environment, in accordance with an embodiment.

As described above, the traditional model of performing updates to a domain configuration does not work well in some computing environments, and presents difficulties such as, for example, determining from which particular layer a particular configuration setting may have originated.

In accordance with an embodiment, an application server, enterprise computing, or other computing environment can include a federated configuration (federated config, config federation) component that enables a runtime domain configuration associated with a server to be derived from a base configuration (such as, for example a config.xml and the external descriptors referenced therefrom), one or more configuration fragments (for example, that provide a subset of a descriptor's XML), and one or more pluggable configuration transformers.

In accordance with an embodiment, each configuration transformer can operate upon or revise a config descriptor's in-memory representation, for example by adding, deleting, or changing configuration elements within that representation. The changes made to an in-memory working runtime configuration (for example, a config tree), can then be used to control the operating configuration and behavior of the server.

In accordance with an embodiment, the one or more configuration fragments can themselves be gathered by one or more pluggable fragment locators, which operate to find or otherwise determine suitable configuration fragments to process.

INTRODUCTION

Many application server, enterprise computing, or other computing environments, such as for example Oracle WebLogic Server (WLS) environments, receive configuration information describing features such as deployed applications and clusters, via a configuration file, such as for example a config.xml file. Each server within a cluster, or group of servers, can read the config.xml, for example using a bean unmarshaller, and create a data structure in-memory, which the server then uses to configure, for example, a domain configuration.

In accordance with an embodiment, instead of relying on a single config.xml file, a federated configuration component enables the collection (federation) of configuration information from multiple sources, each of which provides an XML configuration information, which is then aggregated in-memory and used to provide the server configuration.

In this manner, all of the XML configuration files can contribute to the final configuration in-memory that will be used to control the operating configuration and behavior of the server.

In accordance with an embodiment, federated configuration also provides a mechanism by which an entity interested in modifying or reading a configuration, for example a layered component, can provide a plugin to transform and change the final in-memory configuration, including that at runtime the server will find those components that declare themselves able to modify the configuration in this manner.

For example, in accordance with an embodiment, the federated configuration process can hand-off determination of a domain configuration to a first configuration transformer, and then to a next configuration transformer, and so on. The final domain configuration is then loaded into memory at the server, which from that point onwards proceeds to operate as normal.

In accordance with an embodiment, a config transformer operates on config fragments, which can be provided as XML files that tailor just a small portion of the configuration. Instead of providing a full-sized, e.g., config.xml, the entity interested in modifying or reading a configuration, e.g., layered component, can provide just a smaller fragment of the configuration, which the federated configuration component will operate upon accordingly.

For example, in accordance with an embodiment, a config fragment can include an instruction that a particular server element be added into the configuration being compiled for the server. A configuration hierarchy can be used to indicate where the system can insert the fragment into the configuration tree. Filters can also be used to determine which config fragments should be applied; while the system can also determine when a fragment has changed, potentially requiring a rebuild of the system configuration.

Advantages of the federated configuration approach include, for example, with layered enterprise computing environments, while traditionally such environments might require the use of custom scripts to install and deploy settings into the configuration, to support the various layers of the stack, which hinders the ability to look within the config.xml to see which layer of the stack made which change; federated configuration support for layered configuration enables each different layer to contribute their own configuration changes, and for those changes to be tracked accordingly.

Additional advantages of the federated configuration approach include, for example, multitenant or cloud use cases that enable domains to be customized and rolled out to support new tenants. In such use cases federated configuration operates in a horizontal manner to take one configuration and copy/customize it for each of those tenants, without needing to make any changes to a base config.xml.

Additionally, the federated configuration approach can take advantage of the fact there are typically only a few places where the XML configuration files or fragments need to read from persistent storage to read/create the config.xml. Since these are the only areas where the fragments affect the normal operations of the server, the federation configuration approach is very efficient; if there are no fragments to process, there is minimal change in operation/performance.

Terminology

In accordance with various embodiments, the system can include or utilize some or all of the following features:

Configuration Transformer (Config Transformer): In accordance with an embodiment, a pluggable software component discovered dynamically by the federated configuration (config federation) runtime which revises a config descriptor's in-memory representation, adding, or deleting or changing configuration elements within that representation.

Configuration Fragment (Config Fragment, Fragment): In accordance with an embodiment, a (typically) small subset of a descriptor's XML that contains one or more fragment actions which add, replace, or delete sections of configuration in the working configuration.

Fragment Transformer: In accordance with an embodiment, a configuration transformer which applies config fragments to a configuration.

Base Configuration (Base Config): In accordance with an embodiment, an original (classically, on-disk) configuration, which can be from config.xml or from an external descriptor for system resources.

Working Config: In accordance with an embodiment, an intermediate config (in XML form) reflecting a base config with zero or more config transformers applied.

Fragment Step: In accordance with an embodiment, an XML element in a fragment expressing navigation within a config.

Federated Configuration (Config Federation): In accordance with an embodiment, the various components, methods, and features described herein which enable the use of federated configuration in an application server, enterprise computing, or other computing environment.

Fragment Action: In accordance with an embodiment, a portion of a fragment that describes a single addition, replacement, or deletion of a subtree of content in the config.

Base Config Scope: In accordance with an embodiment, a scope for the entire base config-domain scope for config.xml or a domain-level external descriptor, the particular partition for a partition-specific system resource.

Fragment Scope: In accordance with an embodiment, a scope of the fragment's origin-domain scope or a particular partition (if, for example, the fragment comes from a partition file system).

Step and Action Scope: In accordance with an embodiment, within a fragment, the scope of a given navigational step or fragment action.

Step and Action Filter: In accordance with an embodiment, a pluggable filter that can accept or reject specific fragment steps or actions.

Federated Configuration

FIG. 1 illustrates a system for providing federated configuration in an application server, enterprise computing, or other computing environment, in accordance with an embodiment.

As described above, in accordance with an embodiment, federated configuration applies configuration transformers to configuration information provided by a domain's base configuration (e.g., the XML descriptor content that is provided by a config.xml file and associated external descriptors)—before that configuration information is used to construct, e.g., a bean tree, for subsequent use with the domain.

For example, as illustrated in FIG. 1, a computing environment 102 includes one or more computing hardware components 104 (e.g., a microprocessor, memory, etc), and an application server 106 (e.g., a WebLogic server instance).

In accordance with an embodiment, a federated configuration component 108 enables access to a domain configuration source 110 (e.g., domainDir) that includes a base configuration 112 (e.g., a config.xml file and associated external descriptors) and provides configuration information in the form of XML descriptor content. The application server can provide 116 the contents of the config.xml, during descriptor loading 120, to a bean unmarshaller 122, which creates an in-memory configuration 130, which the application server then uses to configure, for example, a domain configuration.

Figure 2:
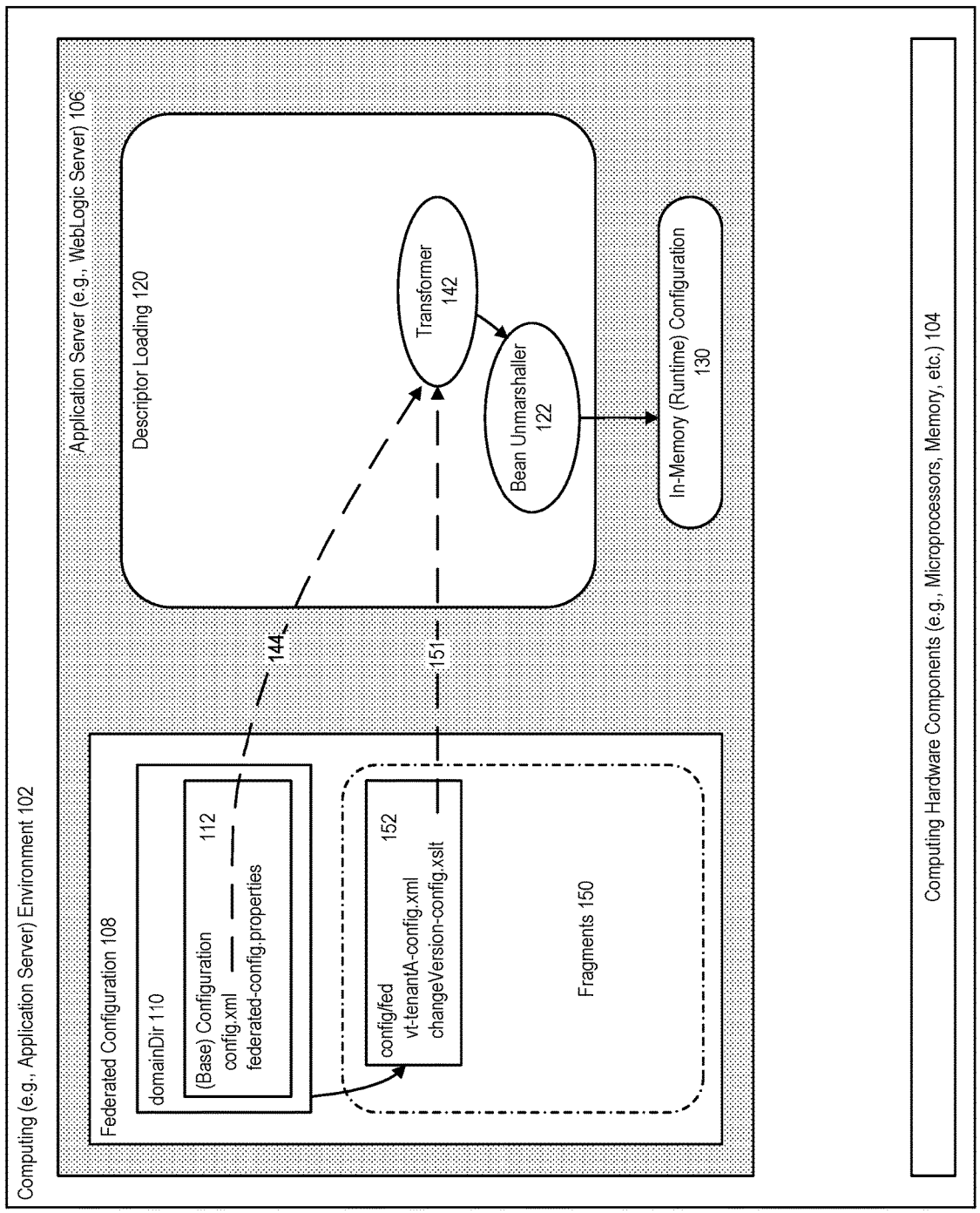
FIG. 2 further illustrates a system for providing federated configuration in an application server, enterprise computing, or other computing environment, in accordance with an embodiment.

FIG. 2 further illustrates a system for providing federated configuration in an application server, enterprise computing, or other computing environment, in accordance with an embodiment.

As illustrated in FIG. 2, in accordance with an embodiment, a configuration transformer 142 can be provided to operate upon or revise a config descriptor's in-memory representation, for example by receiving 144 the base configuration, and adding, deleting, or changing configuration elements within that representation.

In accordance with an embodiment, configuration fragments 150, provided as config.xml snippets provide additional configuration information 151, for use by the transformer, such as by a first fragment 152.

Figure 3:
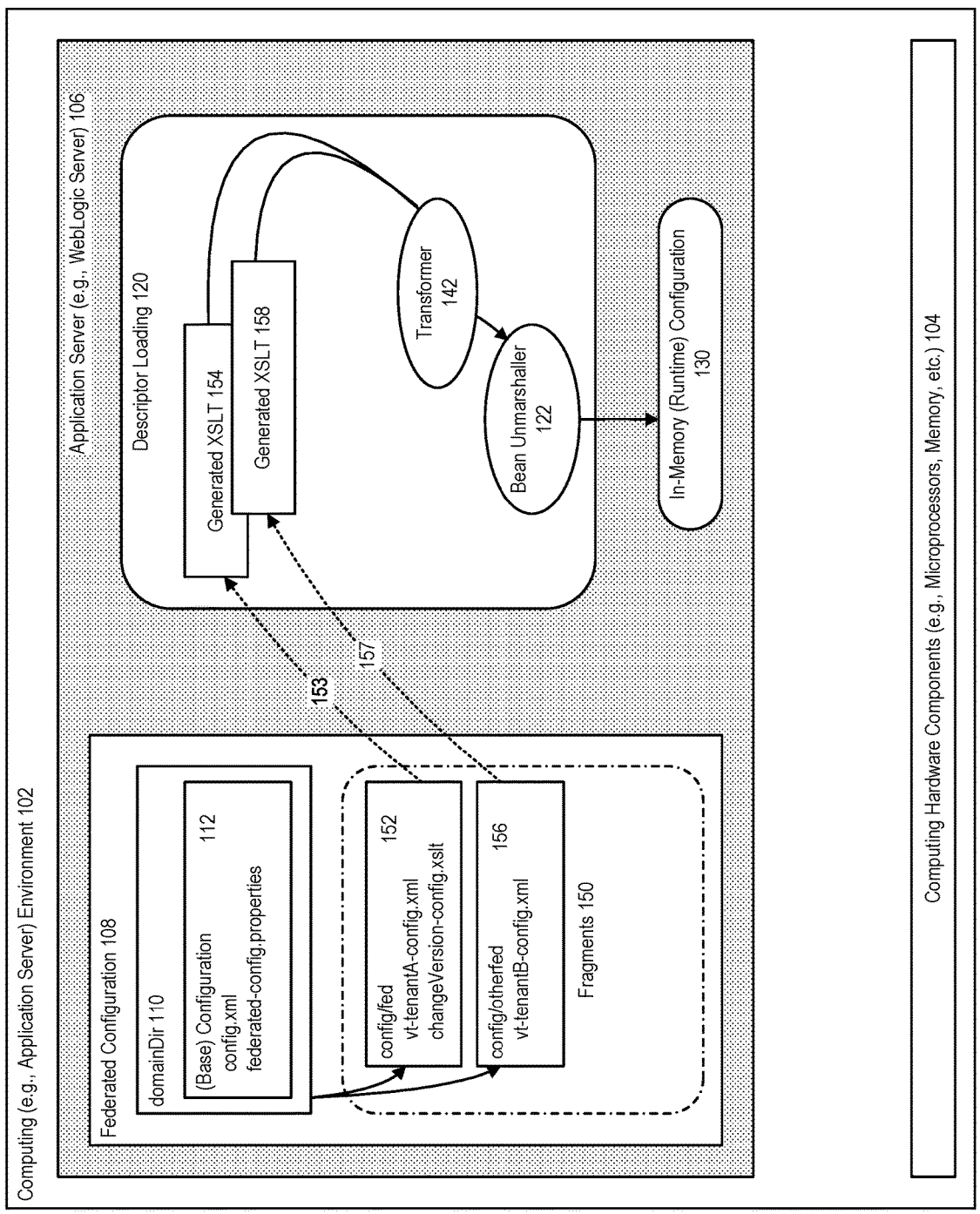
FIG. 3 further illustrates a system for providing federated configuration in an application server, enterprise computing, or other computing environment, in accordance with an embodiment.

FIG. 3 further illustrates a system for providing federated configuration in an application server, enterprise computing, or other computing environment, in accordance with an embodiment.

As illustrated in FIG. 3, in accordance with an embodiment, during descriptor loading by the application server, each fragment, including in this instance the first fragment and a second fragment 156, is used to generate 153, 157 a corresponding XSLT content 154, 158, for subsequent use in determining the domain's configuration.

The resultant configuration information, including that provided by the configuration fragments, is parsed by one or more configuration transformer(s), and then by the bean unmarshaller, to create an in-memory (runtime) configuration, for use in configuring the domain.

Figure 4:
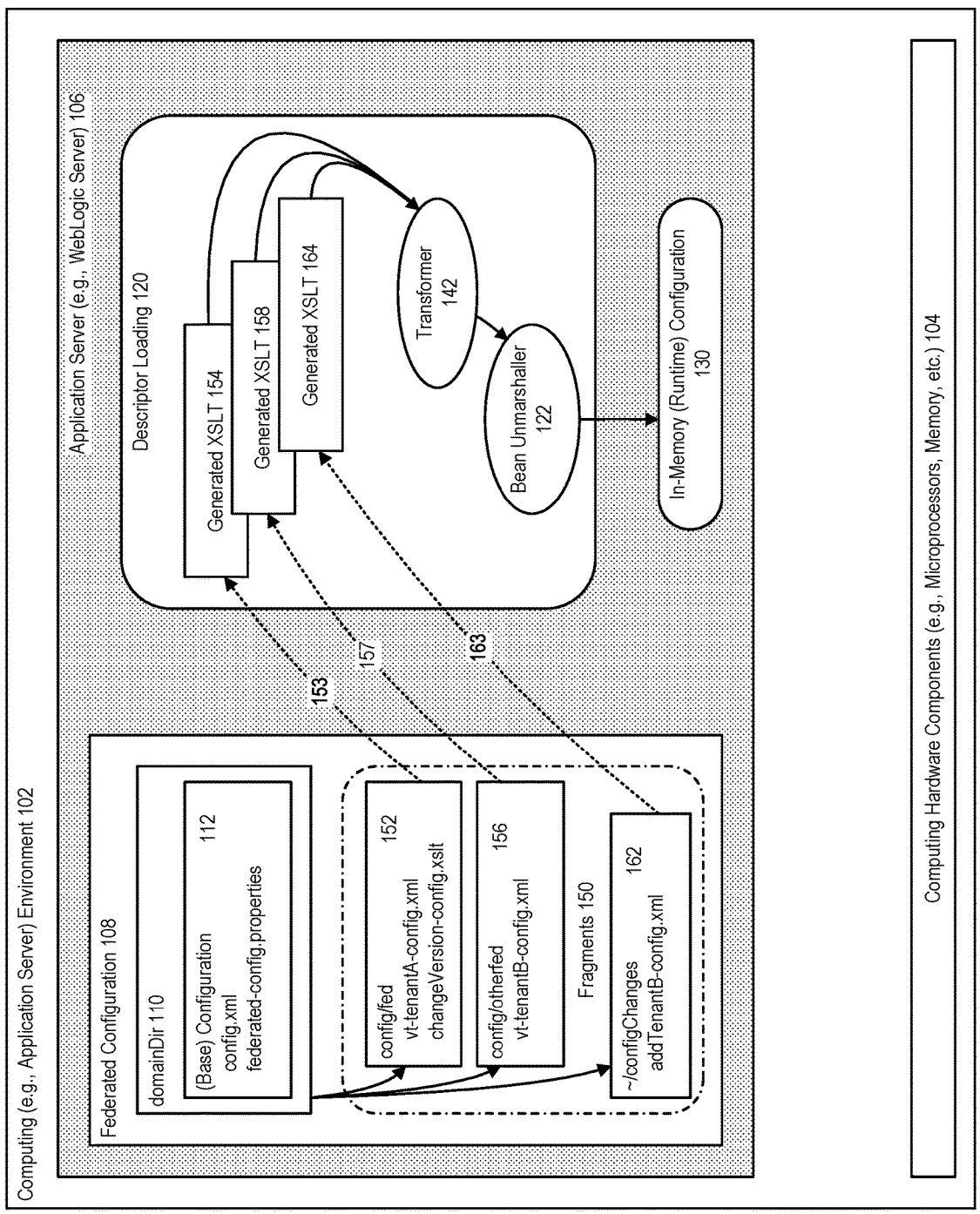
FIG. 4 further illustrates a system for providing federated configuration in an application server, enterprise computing, or other computing environment, in accordance with an embodiment.

FIG. 4 further illustrates a system for providing federated configuration in an application server, enterprise computing, or other computing environment, in accordance with an embodiment.

As illustrated in FIG. 4, in accordance with an embodiment, additional configuration changes can be introduced as additional configuration fragments 162, which can similarly generate 163 additional XSLT content 164, to further modify the in-memory (runtime) configuration.

Figure 5:
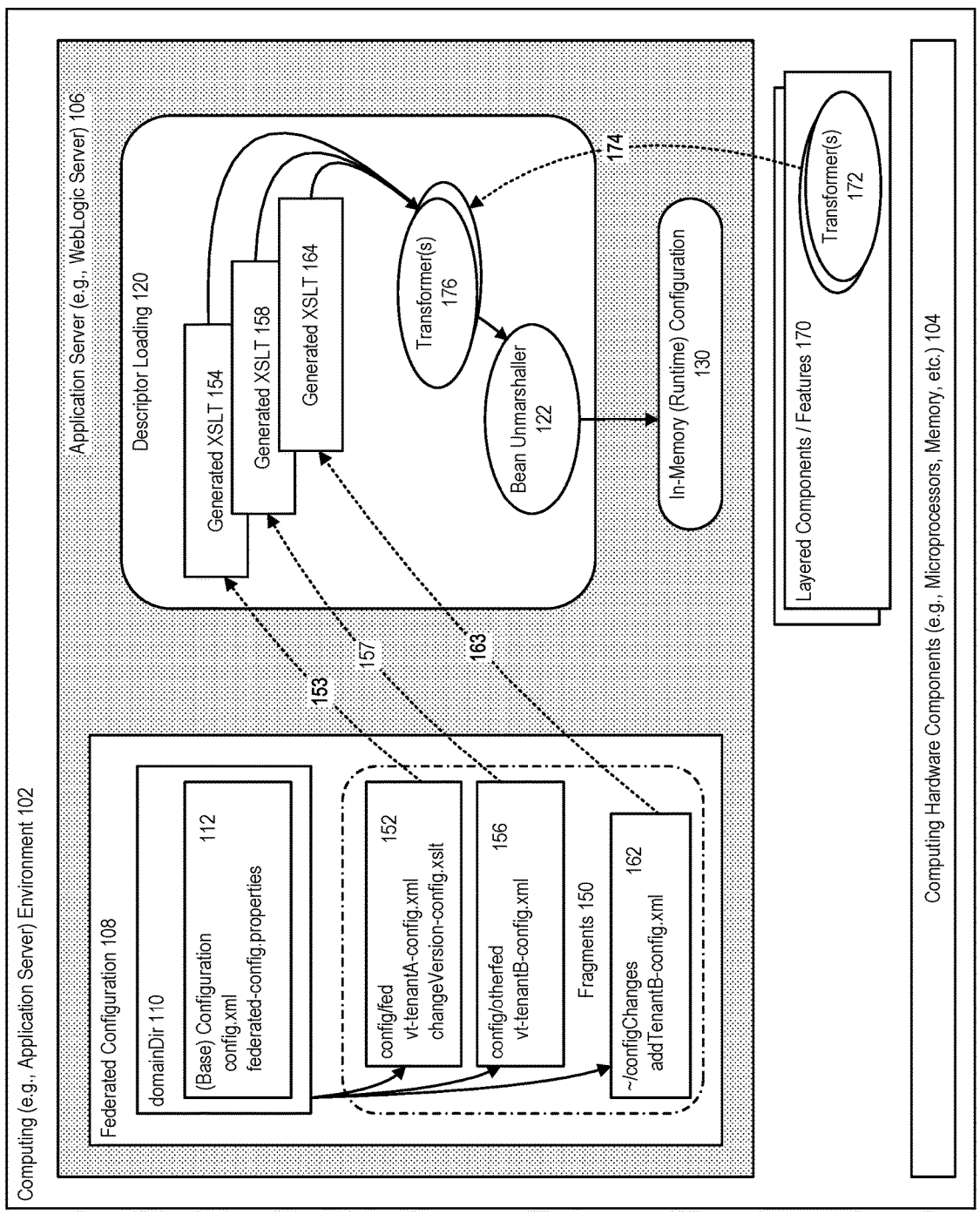
FIG. 5 further illustrates a system for providing federated configuration in an application server, enterprise computing, or other computing environment, in accordance with an embodiment.

FIG. 5 further illustrates a system for providing federated configuration in an application server, enterprise computing, or other computing environment, in accordance with an embodiment.

As illustrated in FIG. 5, in accordance with an embodiment, in an environment which uses layered components or features (e.g., a combination of WebLogic+Oracle SOA+ Oracle Fusion Applications layers), the additional components or features 170 can be associated with their own configuration transformer(s) 172, which be plugged in 174 to monitor configuration fragments for changes, and triggering a dynamic reload if needed.

In accordance with an embodiment, a configuration transformer might not actually modify any of the configuration information, but instead return the input configuration as its output. Multiple configuration transformers can be used; each taking as its input the output from a predecessor; with the input to the first transformer being the original on-disk configuration from the config.xml file, and the output from the last transformer providing the domain's configuration that the server will use to control its domain behavior.

In accordance with an embodiment, each configuration transformer operates as a fragment processor, which interprets configuration fragments and uses them to transform a configuration provided as an input to the fragment processor. A fragment processor can use pluggable fragment locators, to find fragments to process.

As described above, in a typical application server environment, there are relatively few places where XML descriptors are read from disk, so the above approach allows for a minimally-invasive solution. It also helps to avoid the performance cost of creating, e.g., a bean tree from on-disk XML, which might not be used if configuration fragments are present.

Additionally, federated configuration does not change the contents of the config.xml file or an external descriptor as stored in permanent storage. Any changes made by the federated configuration component are to the in-memory working runtime configuration (config tree) that governs the behavior of the server.

In accordance with an embodiment, and as further described below, a configuration fragment can add new content to the working config, replace existing data with alternate content, and delete content. If one considers each fragment action as working with subtrees of config.xml, a fragment action includes navigation to locate the position in the working config.xml where the root of the affected subtree is (for replace or delete) or will be (for add), and (for add and replace) the XML subtree to be plugged into the working config at that point.

In accordance with an embodiment, the configuration fragment can provide the complete navigational path from the top-level element to the element which is the top of the subtree the action applies to. To identify a single instance of a repeating element, the fragment can specify the <name> element and give the value. This is true at every level in the navigation that has repeating elements. If the fragment omits a <name> element in one or more steps along the path then the action(s) will apply to all instances of the type of element for which no <name> was given.

After federated configuration has applied all actions in all fragments, the runtime config in the server will reflect the changes induced by the fragments.

Example Config Fragment

In accordance with an embodiment, an example config fragment is illustrated below:

```
<?xml version='1.0' encoding='UTF-8'?>
<domain
    xmlns="http://xmlns.oracle.com/weblogic/domain"
    xmlns:f="http://xmlns.oracle.com/weblogic/config-fragment"
    xmlns:xsi="http://www.w3.org/2001/XMLSchema-instance"
    xsi:schemaLocation="http://xmlns.oracle.com/weblogic/domain
    http://xmlns.oracle.com/weblogic/1.0/domain.xsd ">
    <domain-version f:combine-mode="replace">12.2.5.6.7</domain-version>
</domain>
```

Adding, Replacing, and Deleting Content Using Fragments

In accordance with an embodiment, a fragment can add new content to the working config, replace existing data with alternate content, and delete content. The fragment action includes navigation to locate the position in the working config.xml where the root of the affected subtree is (for replace or delete) or will be (for add), and (for add and replace) the XML subtree to be plugged into the working config at that point. The fragment can provide the complete navigational path from the top-level element to the element which is the top of the subtree applicable to the action. To identify a single instance of a repeating element the fragment can specify the <name> element and give the value. If the fragment omits a <name> element in one or more steps along the path then the action(s) will apply to all instances of the type of element for which no <name> was given. After the federated configuration component has applied all actions in all fragments, the runtime config in the server will reflect the changes induced by the fragments.

Adding Content

In accordance with an embodiment, a fragment adds a subtree to the working config by providing the navigation to the highest-level element to be added, decorating that element with the f: combine-mode='add' XML attribute, and providing the remainder of the subtree to be added. For example, if the working config does not already contain a server with name 'newServer' this fragment creates it:

```
<domain xmlns="http://xmlns.oracle.com/weblogic/domain"
        xmlns:f="http://xmlns.oracle.com/weblogic/config-fragment">
    <server f:combine-mode='add'>
        <name>newServer</name>
        <listen-address/>
    </server>
</domain>
```

Replacing Content

In accordance with an embodiment, a fragment replaces a subtree already in the working config by providing navigation to the highest-level element to be replaced, decorating that element with the f: combine-mode='replace' XML attribute, and providing the remainder of the subtree that should replace the existing subtree. If the target element of the action does not existing in the working config then the replace action has no effect. For example, if the working config already contains a partition CokePartition and resource group financeRG this fragment turns off the setting that causes the resource group to use the default targets established by the containing partition:

```
<domain xmlns="http://xmlns.oracle.com/weblogic/domain"
        xmlns:f="http://xmlns.oracle.com/weblogic/config-fragment">
    <partition>
        <name>CokePartition</name>
        <resource-group>
            <name>financeRG</name>
            <use-default-target f:combine-mode='replace'>false</use-default-target>
        </resource-group>
    </partition>
</domain>
```

Deleting Content

In accordance with an embodiment, a fragment deletes a subtree already in the working config by providing navigation to the highest-level element to be deleted, and decorating that element with the f:combine-mode='delete' XML attribute. If the target element does not exist in the working config then the delete action has no effect. For example, this fragment removes the financeRG resource group from the CokePartition partition:

```
<domain xmlns="http://xmlns.oracle.com/weblogic/domain"
        xmlns:f="http://xmlns.oracle.com/weblogic/config-fragment">
    <partition>
        <name>CokePartition</name>
        <resource-group f:combine-mode='delete'>
            <name>financeRG</name>
        </resource-group>
    </partition>
</domain>
```

Multiple Actions Per Fragment

In accordance with an embodiment, a single fragment can prescribe more than one action. For example, this fragment turns off default targeting for one resource group while removing another in the same partition:

```
<domain xmlns="http://xmlns.oracle.com/weblogic/domain"
        xmlns:f="http://xmlns.oracle.com/weblogic/config-fragment">
    <partition>
        <name>CokePartition</name>
        <resource-group>
            <name>financeRG</name>
            <use-default-target f:combine-mode='replace'>false</use-default-target>
        </resource-group>
        <resource-group f:combine-mode='delete'>
            <name>hrRG</name>
        </resource-group>
    </partition>
</domain>
```

Multiple Fragments Affect the Same Working Config in Stages

In accordance with an embodiment, more than one fragment can affect the same working config.

Ordering Among Fragments

In accordance with an embodiment, the federated configuration component processes fragments in the order in which the fragment locators provide them, which is in turn influenced by the order in which fragment locators are handled.

Cumulative Effects of Multiple Fragments

In accordance with an embodiment, when the federated configuration component applies the first fragment, it reads the base config provided to it, applies that fragment, and holds the result internally. This intermediate result, not the original base config, is the input to the processing for the second fragment. The output of that processing is stored as the intermediate result, and so on. Once the last fragment has been processed the intermediate result has evolved to become the final result of that invocation of the federated configuration component subsystem for that base config. That final result is returned to the caller for use in building the corresponding bean tree. If multiple fragments act on the same area of the base config then the fragment processed later wins.

Fragments and Different Base Config Types

In accordance with an embodiment, the federated configuration component can work with config.xml and external descriptors for system resources. Each fragment affects exactly one base config type. The navigational path for a fragment action begins with the top-level element. If that element is qualified by its <name> child then the fragment will apply to just that base config. If there is no <name> child with value in the fragment then the fragment will match all base configs of that type. For example, there might be several data source descriptors in the domain. When each is loaded the system invokes the federated configuration component for it. A fragment with a top-level element <jdbc-data-source> but with no <name> child with a value will match the external descriptors for all data sources. A fragment that includes the <name> with a value will select at most one matching base config. Each fragment determines which type of base config it will match simply by specifying the appropriate top-level element.

Logging for Each Fragment Processed

In accordance with an embodiment, as the federated configuration component processes each fragment, it records an INFO-level log message containing the system ID for the Source for that fragment. The fragment locators are responsible for assigning a meaningful system ID to each Source they provide.

Dumping Effective Configuration

In accordance with an embodiment, an administrator can run an, e.g., WLST or ReST command, to dump the effective configuration as XML suitable for use as a descriptor file. This is true for both config.xml and external descriptors for system resources.

Fragments Located Using a Pluggable Interface

In accordance with an embodiment, features which layer on top of the federated configuration component runtime provide pluggable fragment locators. Each locator has the job of knowing where to look for the fragments it cares about, performing any necessary preprocessing on a fragment, and then furnishing the fragments it wants processed when the federated configuration component runtime asks for them. By using this pluggable approach, the runtime itself remains independent of those aspects and does not need configuration of its own to know where to look for fragments or how to deal with them.

Managed Server Independence

In accordance with an embodiment, the config transformer-based and fragment-based approach and the federated configuration component runtime itself are independent of the admin server. Config changes can be delivered as config transformers or config fragments to the various managed servers, rather than as edit session activations. Newly added, updated, or deleted transformers and fragments take effect upon server restart. Other features layered on federated configuration—such as situational config—can apply changes in transformers or fragments at runtime without requiring a server restart by invoking the FragmentReloadingProcessorIntf.

Non-Dynamic Config Changes in Fragments

In accordance with an embodiment, during server start-up, all changes, whether dynamic or non-dynamic, made by transformers and fragments become effective. As dynamic reload invokes transformers and processes fragments it detects if any changes induced are non-dynamic and, if so, logs a warning message. After seeing non-dynamic changes logged by dynamic reload, an administrator can change the involved transformer or offending fragment or remove it entirely, or leave it in place to take effect during the next server start-up.

Pluggable Fragment Filters

In accordance with an embodiment, the federated configuration component uses pluggable fragment filters to decide how to limit what a fragment can do. As it processes a fragment step or action, the federated configuration component asks each filter it can find to vote on whether the step or action should be allowed. A filter votes "no" by returning one or more objections as strings and votes "yes" by returning an empty list of objections.

Error Handling During Federation

In accordance with an embodiment, the federated configuration component can throw various of exceptions, for example: a FragmentProcessingException; or any other Exception. Callers can catch exceptions thrown by the federated configuration component and, if it makes sense in context, continue on using the original XML content to construct the bean tree.

Severities of Response to Fragment Processing Exceptions

In accordance with an embodiment, filters can lodge objections to a navigational step or an action in a fragment. For example, the federated configuration component distinguishes among three different severities with which the federation operation can respond to such objections. Each different severity of response skips different amounts of federation processing as a result of a filter reporting an objection. Table 1 illustrates examples of various severities, in accordance with an embodiment.

TABLE 1

| Severity | System Response | Federation ignores . . . | Processing continues with . . . |
| --- | --- | --- | --- |
| step | Logs warning message. | Offending step or action | Other steps and actions in the same fragment. |
| fragment | Logs warning message. | Offending fragment | Other fragments. |
| federation | Throws Fragment Processing Exception | Entire operation - all fragments | Exception handling in the code which invoked federated configuration. None of the fragments will have been applied to the runtime config. |

Caller-Specified Severity and Fragment-Specified Severity

In accordance with an embodiment, the code that invokes federated configuration can pass a severity level to influence how that invocation deals with filter objections. Also, each fragment locator can influence the severity with which each federation occurs. When the fragment locator prepares the Source for the fragment it can add a query severity=value to the systemId URI of the Source, where value is step, fragment, or federation. There can be cases in which the fragment locator wants to make sure that all fragments are acceptable (without objection from filters), or no fragments are applied. During any given invocation of federated configuration, the effective severity is the maximum of the caller-supplied and fragment-supplied severity.

Resiliency

In accordance with an embodiment, an error during delegation to a config transformer—including the processing of a fragment—or during the preparation of the bean tree from the updated effective configuration should not be allowed to abort a server start-up. Instead, the call sites that invoke federated configuration should catch exceptions thrown either by federated configuration itself or by the attempt to build the bean tree using the result. In response to either type of error the code calling federated configuration can use the original base config to build the bean tree of interest and continue from there.

Because config.xml and external descriptors are federated separately—because their descriptors are constructed from their base configs separately—this raises the prospect of processing errors causing only some transformers and fragments to be applied to only some base configs.

To be able to recover as fully as possible, call sites need to have access to the original content of the InputStream that they pass to the federated configuration component. This is because the federated configuration component might completely consume and close the InputStream but the federated result might not pass bean validation. At that point the caller needs to be able to build the bean tree using the original content. A convenience RestartableInputStream which callers can wrap around their original input stream. Like the ByteArrayInputStream, this class permits stream operations even after the stream has been closed and supports mark and reset. This class also automatically marks the stream initially. Then, if for any reason the caller wants to reuse the content of the stream after the federated configuration component has used the stream the caller can invoke reset and the stream will provide the same content again.

Example Implementation

The example provided below illustrates a particular embodiment. In accordance with various embodiments, different and/or other implementation features can be provided.

Overall FederatedConfig Behavior Contract

In accordance with an embodiment, the public behavior contract exposed by the federated configuration component logic is this:

A caller uses HK2 to obtain an instance of FederatedConfig and invokes one of its combine methods, passing the base config as an InputStream. The caller can also pass a boolean to turn on or off strict handling of filter objections; strict handling throws a FederatedConfigProcessingException while non-strict handling continues while logging warnings.

The instance of FederatedConfig locates zero or more config transformers. In practice, there will always be at least one, the fragment-handling transformer for which:

Each fragment is a Source (in the javax.xml.transform package, an abstraction of a source of XML).

Each fragment can contain zero or more sections to be added to, deleted from, or replaced in the working config.

The FederatedConfig instance starts with the working config as the initial base config, and invokes all discovered config transformers, passing the current working config to the next transformer. Each transformer might or might not apply changes to the working config. FederatedConfig then returns an InputStream with the possibly-adjusted config content.

If no transformers are found, or the result is the same as the original base config, then the same InputStream passed in is returned. Callers can (if they find it useful) use == to compare the original InputStream to the returned one to tell if any changes were made.

Types of Change Supported in Fragments

In accordance with an embodiment, a fragment can contain sections which can change the working config in these ways: add new content; replace existing content; or delete existing content.

Fragment Format and Semantics

In accordance with an embodiment, each fragment is well-formed XML. The top-level element of each fragment matches the top-level element of the working config it should affect, and declares any namespaces referenced in the fragment, including the top-level element's namespace and the namespace for the federated config.xml attribute that tells how to affect the working config.

Additional Example

In accordance with an embodiment, an additional example fragment is illustrated below:

```
<domain
    xmlns="http://xmlns.oracle.com/weblogic/domain"
    xmlns:f="http://xmlns.oracle.com/weblogic/config-fragment">
  <server>
    <name>myserver</name>
    <server-debug>
      <debug-server-life-cycle f:combine-mode='replace'>true</debug-server-life-cycle>
    </server-debug>
  </server>
  <partition>
    <name>CokePartition</name>
    <resource-group f:combine-mode='delete'>
      <name>doomedRG</name>
    </resource-group>
  </partition>
  <resource-group-template f:combine-mode='add'>
    <name>medrecRGT</name>
    <mail-session>
      <name>mail/MedRecMailSession</name>
      <jndi-name>/mail/MedRecMailSession</jndi-name>
      <properties>mail.host=mail.mycompany.com;mail.user=joe</properties>
    </mail-session>
  </resource-group-template>
</domain>
```

In accordance with an embodiment, the above example illustrates one config fragment with three actions. Each action is dictated by one of the three elements that have the f: combine-mode XML attribute. The attributes' values say what action to perform after doing the navigation implied by the element and its place in the fragment.

For example, the first action says to navigate from the top-level domain to the specific server named myserver and then to that server's server-debug and its debug-server-life-cycle, replacing its value with "true" regardless of what the current value might be.

The second action says to delete the resource group named doomedRG from the partition named CokePartition.

The third action will add a resource group template named medrecRGT to the domain.

Behavior of Fragment Processing

In accordance with an embodiment:

The <name> element is treated specially for navigation, just as it is when used in the config tree built from the working config.xml. In config trees the name is critically important in uniquely identifying members of a collection. For example, servers are distinguished from each other by their child <name> elements. Similarly, in the fragment the server's<name> element itself is not on the direct path from the <domain> to the <debug-server-life-cycle> element where an action is to occur; but it serves to qualify which <server> element of possibly several is the one that should be on the navigational path.

An add action inserts the entire subtree rooted at the added element into the effective config.

A replace action replaces the entire subtree rooted identified by the element with the f: combine-mode attribute with that element and its subtree.

A delete action typically specifies not only the root of the subtree to be removed but also the <name> child. If a fragment omits the <name> sub-element of a repeating ancestor element (like <server> in this example) involved in a replace or delete action, then that action is applied to all instances of the unqualified ancestor type. Specifically, if this example fragment omitted the <name>myserver</name> from the navigation then <debug-server-life-cycle> would be set to true for all servers present in the working config.

In accordance with an embodiment, internally within the federated configuration component, these actions operate on the XML not on the POJO bean objects that will be constructed from the XML. When the application server, e.g., WLS, writes out config to XML, it omits defaulted content. The federated configuration component takes care of this automatically and, conceptually, "fills in" any XML referenced by the fragment that is not explicit in the working config.

Choosing 'Add' Vs. 'Replace' to Set Content

In accordance with an embodiment, 'add' can be used to create new instance of a repeating element, or 'replace' used otherwise. A 'replace' can also be used if the XML is already present in the "filled-in" working config and it is desired to change the subtree there. 'replace' should be used if the target element is a singleton within its parent. To assign a non-default value to a singleton use <isDebug f:combine-mode='replace'>true</isDebug> which will work whether <isDebug> appears explicitly in the working config or not. A 'replace' should also be used if the target element appears multiple times and it is desired to act on one or all instances. The <name> element should be specified with a value as a child of the repeating element to select a specific instance; or omitted to select all repeating instances.

In accordance with an embodiment, 'add' can be used if the XML is not already present in the "filled-in" working config; in other words, to insert a new instance of an element that can repeat within its parent. The <name> element can be used to uniquely identify the new instance among its peers that might already exist in the working config.

Choosing 'Replace' Vs. 'Delete' to Clear Content

In accordance with an embodiment, 'delete' can be used to remove one or all instances of a repeating element, and use 'replace' otherwise. A 'replace' can be used if the XML is already present in the "filled-in" working config and it is desired to change the subtree there. A 'replace' should be used if the target element is a singleton within its parent. To force a setting to its default one can use:
<debug-server-lifecycle f:combine-mode='replace'/>

A 'delete' can be used if the target is one or all repeating elements. The <name> element and its value can be used to select a single instance; or omitted to select all targeted repeating elements.

Bean Validation but No XML Schema Validation of Federated Configuration

In accordance with an embodiment, the application server, e.g., WLS, unmarshalling code that converts XML into bean trees allows the caller to select whether to validate or not. This single boolean argument controls both XML schema validation and bean validation.

In accordance with an embodiment, if no fragments are present the code path runs and triggers XML and bean validation if that is indicated; and honors a system property setting to suppress validation. It also checks for any change in the base config on-disk and skips validation if there has been none.

In accordance with an embodiment, if the federated configuration component does apply fragments or discovered other transformers, then the modified descriptor-loading code in the application server, e.g., WLS, suppresses XML validation when the combined config is unmarshalled.

Since the federated configuration component suppresses the combined XML-and-bean validation of the combined config during unmarshalling, the federated configuration component explicitly performs bean validation of the bean tree that results from combining fragments with the base config. This makes sure that the fragments, though perhaps creating a syntactically correct combined config, did not introduce any inconsistencies in the configuration.

The bean validation is triggered after all fragments have been applied and the bean tree has been constructed from the federated config, not as each fragment is processed. Any bean validation errors prevent the federated config from being used. The bean validation error is logged and the system uses the original base config as if no fragments were present.

Fragment Scoping

In accordance with an embodiment, scoping is how federated configuration limits the effect of a given fragment to only the config to which it should apply when either all or part of the config or the fragment itself lies in an identifiable scope. There can be different scope types, each of which can have a set of scope values that make sense for it.

For example, one form of scoping can be partition scoping, the values for which indicate either global scope (for domain-level) or for a specific partition. Scoping can be associated with a fragment and an entire descriptor. A filter can infer different scopes from different parts of config.xml. For example, although config.xml itself would have the global partition scope, the portion of it containing the configuration for a given partition can be considered to have that partition's scope.

Scoped Descriptors

In accordance with an embodiment, conceptually, every base config submitted to the federated configuration component for processing has a scope. In practice, the scope of config.xml is always global. The scope of an external descriptor for a system resource can be either global or for a particular partition. The code which presents an external descriptor to the federated configuration component for processing indicates what scope, if any, should be associated with that external descriptor (configurationExtension) when it invokes the main entry point of federated configuration.

Scoped Fragments

In accordance with an embodiment, some features built on federated configuration might use fragments that should apply only to a selected scope. For example, fragments in a partition's partition file system can be scoped to that partition. The fragment locator can create the source for such a fragment so that its system ID indicates the scope using ?scope=scopeType=scopeValue.

Fragment Filters

In accordance with an embodiment, the federated configuration component uses pluggable filters to decide how to limit what a fragment can do. As it processes a fragment step or action, the federated configuration component asks each filter it can find to vote on whether the step or action should be allowed. A filter votes "no" by returning one or more objections as Strings and votes "yes" by returning an empty list. If any filter votes "no" then the federated configuration component ignores the step or action, assuming lax fragment handling. If strict fragment handling was selected then the federated configuration component stops processing fragments on the current descriptor. The caller detects this and deals with it however makes sense for it; otherwise the federated configuration component logs a warning message about the filter's objections and continues. The federated configuration component invokes each filter passing information about the step or action of interest from a fragment, scope information about that fragment, and scope information about the original descriptor. Filters can be dynamically discovered as HK2 services.

Sanity Checking of Fragments Using a Filter

In accordance with an embodiment, a filter provides sanity checking of fragments (avoiding the need to create schemas for fragments and use them for XML validation). If a fragment's navigation does not match the config bean structure it claims to apply to then the sanity-checking filter votes "no" which would cause the federated configuration component to log a warning message, alerting the administrator that the fragment needs to be fixed.

Partition Scoping Using a Filter

In accordance with an embodiment, a filter can implement partition scoping. The filter would infer the partition scope from the navigation indicated by the steps from the fragment. If the scope of the fragment is for a given partition then the filter would accept only navigational steps and actions within the part of config.xml related to that partition. The filter would reject navigation or actions if the inferred scope of the step does not share the same partition scope as the fragment.

Pluggable Fragment Discovery

In accordance with an embodiment, the federated configuration component defines an HK2 contract FederatedConfigFragmentLocator. When the federated configuration component code needs to get the fragments to apply to a descriptor it uses HK2 to find all implementations of FederatedConfigFragmentLocator. Each implementation of that contract furnishes the fragments it knows about. The federated configuration component code then composes the effective configuration by starting with the base config being federated and applying the fragments one at a time.

The locators provide a Source object for each fragment. Providing a source allows fragments to come from any origin, such as, for example, the file system, a database, or Coherence. Each locator knows how and where to find the fragments it is responsible for and creates a source for each. The source interface exposes a system ID which is a URI for the source. The federated configuration component implementation uses each fragment's system ID in logging, so locators can create Source objects with meaningful URIs. Fragment locators themselves are considered trusted, while fragments they might provide from partition file systems are not.

Fragment Ordering

In accordance with an embodiment, the federated configuration component applies fragments one at a time in the order in which it retrieves them from locators' Iterators. It works with locators in the order that the HK2 IterableProvider delivers them. Each locator is in complete control of the order in which it presents its fragments for processing.

Locator Ordering

In accordance with an embodiment, if ordering among locators is important for a particular feature built on federated configuration, then one way is for the locators to use the HK2 @Rank annotation which HK2 uses to control the order in which it reports implementations of a contract. Another approach can be for a single "wrapper" locator to know about the other locators that have more stringent ordering constraints among them. That wrapper locator would invoke the locators it knows about in whatever order it decided was proper, then report as its own the sources reported from its managed locators.

Locator and Transformer Discovery

In accordance with an embodiment, the federated configuration component might need to dynamically discover new implementations of the fragment locator interface or the config transformer interface while the server is running (as distinct from a fragment locator dynamically discovering new fragments, for example). Each time it is invoked the federated configuration component code gets an Iterator over locators and transformers from HK2 IterableProviders of locators and transformers, respectively. The HK2 implementation can dynamically discover new implementations of an HK2 contract so the federated configuration component will learn about them.

Triggering Federated Configuration

In accordance with an embodiment, federated configuration can be configured to run any time a base config descriptor is read and a bean tree created from it, such as for example, at server start-up; or activation of an edit session.

Support for Other Triggers

In accordance with an embodiment, features layered on top of federated configuration might need to do federated configuration at other times. For example, such a feature might monitor fragments or fragment directories. When a fragment is added, updated, or deleted, the feature would need to rebuild the runtime config tree using the latest fragments.

Although the federated configuration component does not itself provide these triggering mechanisms, the API is designed to be very simple, for example use of an injectable HK2 service FragmentReloadingProcessor. Features layered on federated configuration can build their own monitoring implementation. Upon detecting a change necessitating a dynamic reload, such a feature can invoke this processor's updateFederatedConfiguration method which will cause all fragments currently discoverable to be reapplied to the base config.

Federated Configuration Method

Figure 6:
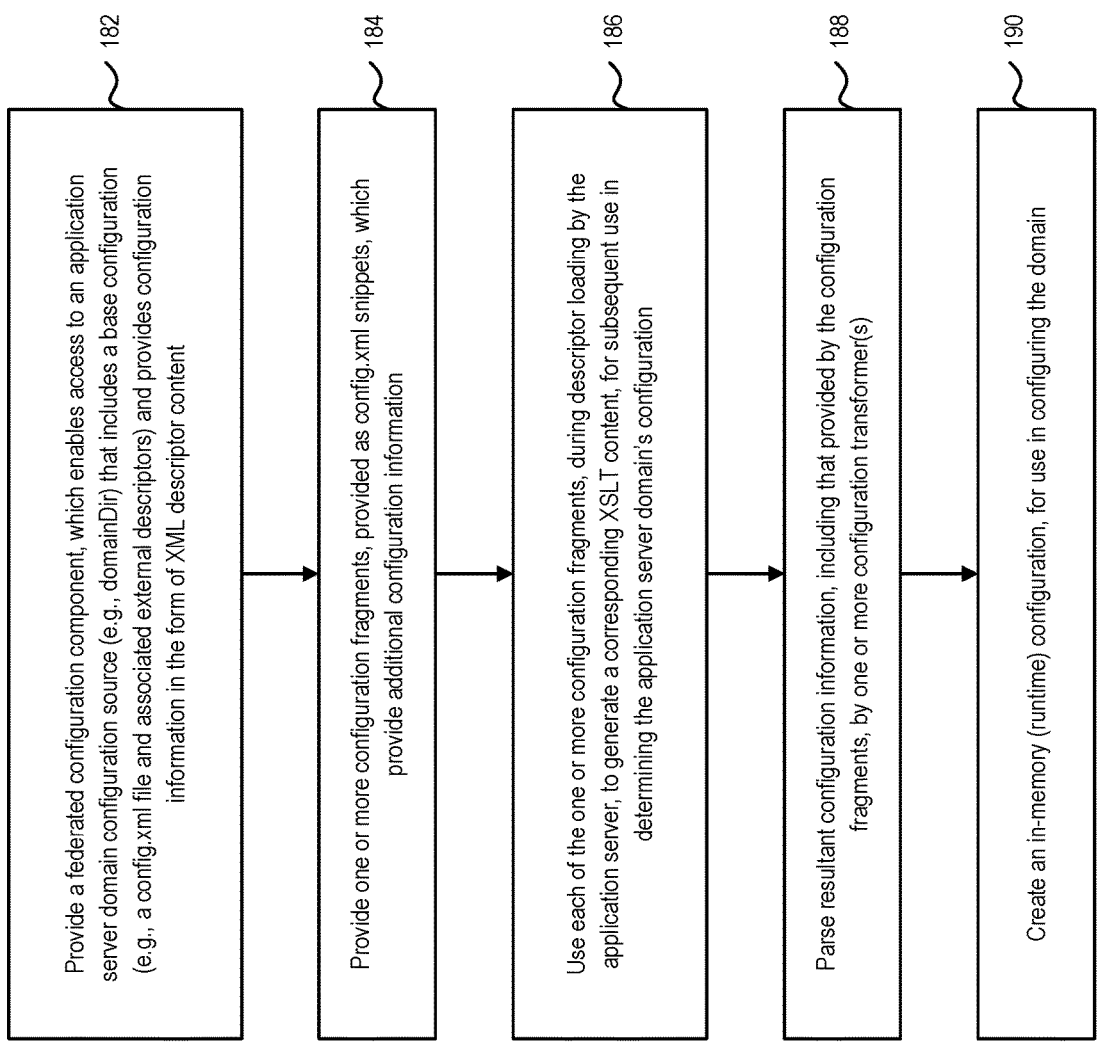
FIG. 6 illustrates a method for providing federated configuration in an application server, enterprise computing, or other computing environment, in accordance with an embodiment.

FIG. 6 illustrates a method for providing federated configuration in an application server, enterprise computing, or other computing environment, in accordance with an embodiment.

As illustrated in FIG. 6, in accordance with an embodiment, at step 182, a federated configuration component is provided, which enables access to an application server domain configuration source (e.g., domainDir) that includes a base configuration (e.g., a config.xml file and associated external descriptors) and provides configuration information in the form of XML descriptor content.

At step 184, one or more configuration fragments, provided as config.xml snippets, provide additional configuration information.

At step 186, each of the one or more configuration fragments, during descriptor loading by the application server, are used to generate a corresponding XSLT content, for subsequent use in determining the application server domain's configuration.

At step 188, the resultant configuration information, including that provided by the configuration fragments, is parsed by one or more configuration transformer(s), and then, at step 190, by the bean unmarshaller, to create an in-memory (runtime) configuration, for use in configuring the domain.

Layered Configuration Use Case

In accordance with an embodiment, the system includes support for a layered configuration architecture.

Figure 7:
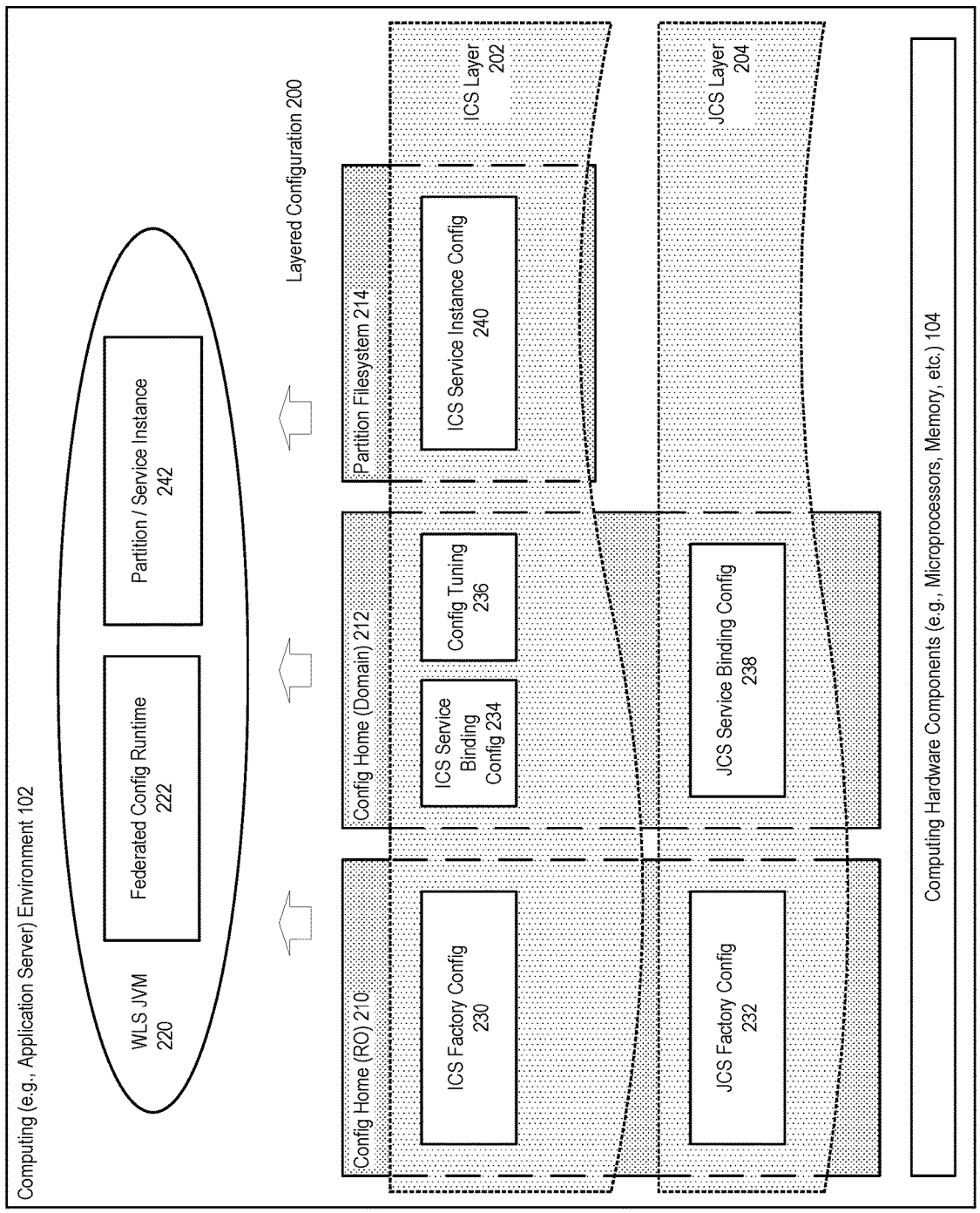
FIG. 7 illustrates the use of federated configuration in providing a layered configuration architecture, in accordance with an embodiment.

FIG. 7 illustrates the use of federated configuration in providing a layered configuration architecture, in accordance with an embodiment. As illustrated in FIG. 7, in accordance with an embodiment, a layered configuration 200 can include, for example, an ICS layer 202, and JCS layer 204. An application server (e.g., WebLogic, WLS) JVM 220 can be configured with a federated configuration runtime 222 and partition/service instance 242, based on a config home (RO) configuration 210, including ICS factory config 230, and JCS factory config 232; config home (domain) configuration 212, including ICS service binding config 234, config tuning 236, and JCS service binding config 238; and partition filesystem configuration 214, including ICS service instance config 240.

Figure 8:
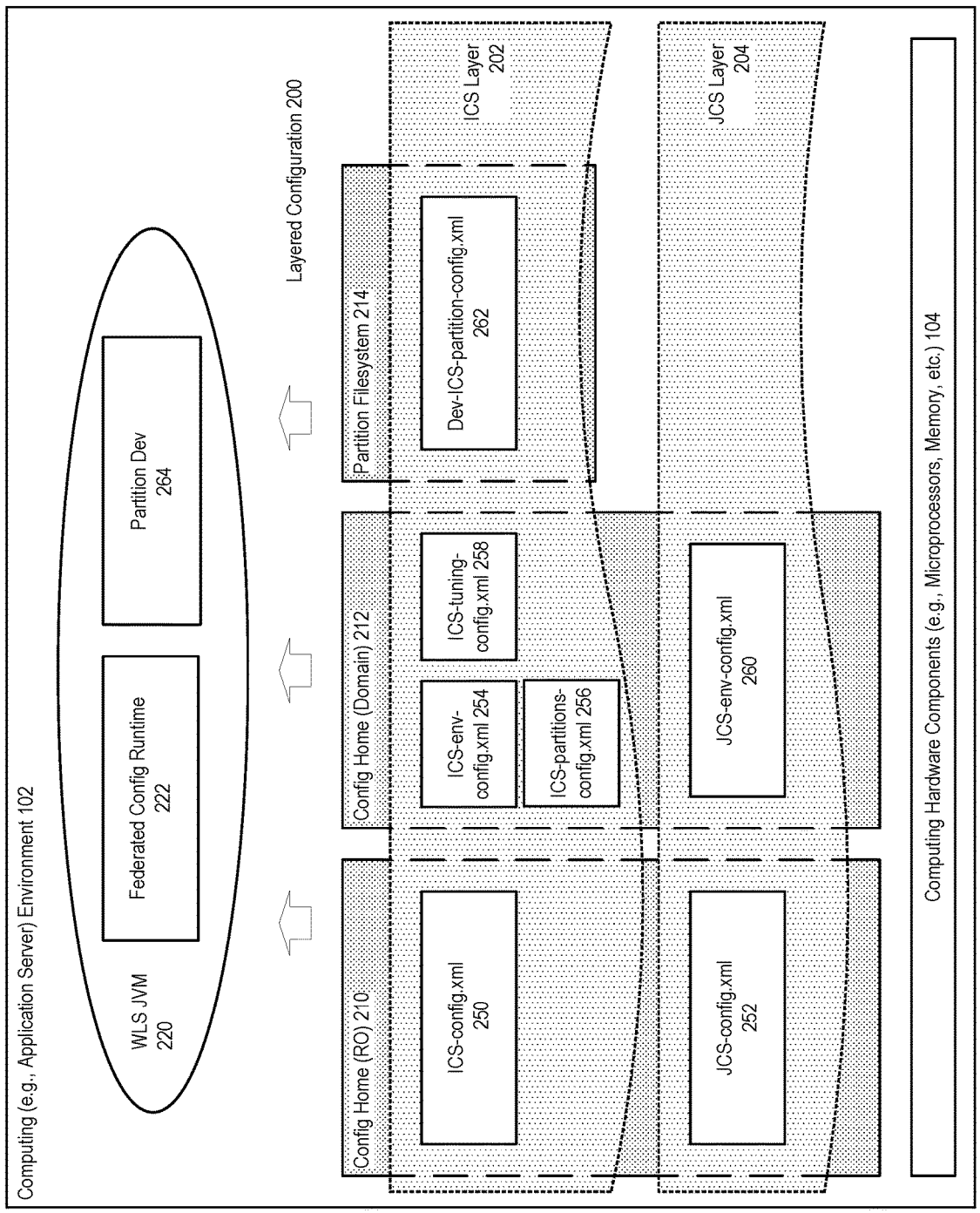
FIG. 8 further illustrates the use of federated configuration in providing a layered configuration architecture, in accordance with an embodiment.

FIG. 8 further illustrates the use of federated configuration in providing a layered configuration architecture, in accordance with an embodiment. As illustrated in FIG. 8, in accordance with an embodiment, the federated configuration component can created a federated configuration for the application server, e.g., WLS, JVM, including a partition configuration 264, from a plurality of configuration fragments associated with, in this example, an ics-config.xml 250, JCS-config.xml 252, ICS-env-config.xml 254, ICS-partitions-config.xml 256, ICS-tuning-config.xml 258, JCS-env-config.xml 260, and DEV-ICS-partition-config.xml, each of which can participate in defining configuration for the application server, e.g., WLS, JVM, while retaining the advantages of the federated configuration technique described above.

Additional Use Cases

In addition to the embodiments of federated configuration, and features described, in accordance with various other embodiments, the federated configuration runtime enables other use cases, such as for example:

Layered config—by allowing config changes needed by different software layers to exist separate from the base config files (for example, as fragments in those layers)

Situational config—by allowing (typically) temporary config changes to reside separate from the base config files (e.g., in fragments created only when needed and deleted as soon as their usefulness is complete).

Intra-layer separation—by allowing a layer's contribution to the configuration to be spread out over multiple transformers or fragments, perhaps with each focused on a separate type of configuration Immutable config—by allowing the base config and even some adjustments to config (such as fragments as in "layered base config") to be in read-only file systems while other adjustments/fragments are in read/write areas.

Managed server independence—by allowing config updates to occur outside the classic transactional approach of edit sessions driven by the admin server.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or media or device suitable for non-transitory storage of instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing federated configuration in an application server, enterprise computing, or other computing environment, comprising:
a computer including a microprocessor, which executes one of an application server, enterprise computing, or other computing environment; and
a federated configuration component which enables a server's runtime domain configuration to be derived from:
a base configuration, that is parsed to create an in-memory representation of a domain configuration;
one or more configuration fragments, wherein the configuration fragments are gathered by one or more pluggable fragment locators which operate to find or otherwise determine configuration fragments to process, wherein each configuration fragment provides additional configuration information that indicates an action including at least one of an addition, replacement, or deletion of an indicated portion of the base configuration with a modified configuration; and
one or more pluggable configuration transformers that modify the in-memory representation of the domain configuration as specified by the configuration fragments;
wherein changes made to the in-memory representation of the domain configuration created by the actions of the configuration fragments are then used to control configuration and behavior of the server.

2. The system of claim 1, wherein the server's runtime domain configuration is derived from the base configuration provided as an XML configuration file, and external descriptors referenced therefrom.

3. The system of claim 2, wherein each of the one or more configuration fragments provide a subset of a descriptor's XML.

4. The system of claim 1, wherein each of the one or more pluggable configuration transformers revises a config descriptor's in-memory representation by at least one of adding, deleting, or changing configuration elements within that representation.

5. A method for providing federated configuration in an application server, enterprise computing, or other computing environment, comprising:
performing, at a computer including a microprocessor, which executes one of an application server, enterprise computing, or other computing environment, a process of federated configuration which enables a server's runtime domain configuration to be derived from:
a base configuration, that is parsed to create an in-memory representation of a domain configuration;
one or more configuration fragments, wherein the configuration fragments are gathered by one or more pluggable fragment locators which operate to find or otherwise determine configuration fragments to process, wherein each configuration fragment provides additional configuration information that indicates an action including at least one of an addition, replacement, or deletion of an indicated portion of the base configuration with a modified configuration; and
one or more pluggable configuration transformers that modify the in-memory representation of the domain configuration as specified by the configuration fragments; and
applying changes made to the in-memory representation of the domain configuration created by the actions of the configuration fragments to control configuration and behavior of the server.

6. The method of claim 5, wherein the server's runtime domain configuration is derived from the base configuration provided as an XML configuration file, and external descriptors referenced therefrom.

7. The method of claim 6, wherein each of the one or more configuration fragments provide a subset of a descriptor's XML.

8. The method of claim 5, wherein each of the one or more pluggable configuration transformers revises a config descriptor's in-memory representation by at least one of adding, deleting, or changing configuration elements within that representation.

9. A non-transitory computer readable storage medium, including instructions stored therein which when executed by one or more computers including a processor perform a method comprising:
performing, at a computer including a microprocessor, which executes one of an application server, enterprise computing, or other computing environment, a process of federated configuration which enables a server's runtime domain configuration to be derived from:
a base configuration, that is parsed to create an in-memory representation of a domain configuration;
one or more configuration fragments, wherein the configuration fragments are gathered by one or more pluggable fragment locators which operate to find or otherwise determine configuration fragments to process, wherein each configuration fragment provides additional configuration information that indicates an action including at least one of an addition, replacement, or deletion of an indicated portion of the base configuration with a modified configuration; and
one or more pluggable configuration transformers that modify the in-memory representation of the domain configuration as specified by the configuration fragments; and
applying changes made to the in-memory representation of the domain configuration created by the actions of the configuration fragments to control configuration and behavior of the server.

10. The non-transitory computer readable storage medium of claim 9, wherein the server's runtime domain configuration is derived from the base configuration provided as an XML configuration file, and external descriptors referenced therefrom.

11. The non-transitory computer readable storage medium of claim 10, wherein each of the one or more configuration fragments provide a subset of a descriptor's XML.

12. The non-transitory computer readable storage medium of claim 9, wherein each of the one or more pluggable configuration transformers revises a config descriptor's in-memory representation by at least one of adding, deleting, or changing configuration elements within that representation.

* * * * *